(12) United States Patent
Yang et al.

(10) Patent No.: US 11,275,178 B2
(45) Date of Patent: Mar. 15, 2022

(54) METHOD AND DEVICE FOR DRAWING REGION OUTLINE AND COMPUTER READABLE STORAGE MEDIUM

(71) Applicant: Shenzhen 3irobotix Co., Ltd., Guangdong (CN)

(72) Inventors: Yong Yang, Guangdong (CN); Zexiao Wu, Guangdong (CN); Zhifan Zheng, Guangdong (CN)

(73) Assignee: Shenzhen 3irobotix Co., Ltd., Guangdong (CN)

( * ) Notice: Subject to any disclaimer, the term of this patent is extended or adjusted under 35 U.S.C. 154(b) by 0 days.

(21) Appl. No.: 16/767,353

(22) PCT Filed: Feb. 2, 2018

(86) PCT No.: PCT/CN2018/075158
§ 371 (c)(1),
(2) Date: May 28, 2020

(87) PCT Pub. No.: WO2019/104866
PCT Pub. Date: Jun. 6, 2019

(65) Prior Publication Data
US 2020/0379115 A1 Dec. 3, 2020

(30) Foreign Application Priority Data
Nov. 28, 2017 (CN) .......................... 201711214737.3

(51) Int. Cl.
*G01S 17/93* (2020.01)
*G01S 17/931* (2020.01)
(Continued)

(52) U.S. Cl.
CPC .......... *G01S 17/931* (2020.01); *G01S 7/4808* (2013.01); *G01S 17/89* (2013.01); *G06K 9/6215* (2013.01)

(58) Field of Classification Search
None
See application file for complete search history.

(56) References Cited

U.S. PATENT DOCUMENTS 9,317,735 B2 * 4/2016 Watanabe ................. G06T 7/75
2004/0168148 A1 * 8/2004 Goncalves ........... G05D 1/0248
717/104

(Continued)

FOREIGN PATENT DOCUMENTS

CN 101093503 A 12/2007
CN 201573208 U 9/2010
(Continued)

OTHER PUBLICATIONS

International Search Report, Application No. PCT/CN2018/075158, dated Aug. 9, 2018, 3 pages (English Translation Attached).
(Continued)

*Primary Examiner* — Hovhannes Baghdasaryan
(74) *Attorney, Agent, or Firm* — Ziegler IP Law Group, LLC

(57) ABSTRACT

A method and device for drawing an outline of a region and a computer-readable storage medium are provided. The method includes: updating an original region outline map according to a first predetermined algorithm to obtain a first region outline map; updating the original region outline map according to a second predetermined algorithm to obtain a second region outline map; acquiring and processing first distance data obtained by a laser radar to generate a first to-be-matched outline map; comparing the first to-be-matched outline map with the first region outline map and the second region outline map, respectively; and replacing the second region outline map with the first region outline map if the similarity between the first region outline map and the first to-be-matched outline map is higher than the (Continued)

similarity between the second region outline map and the first to-be-matched outline map.

9 Claims, 2 Drawing Sheets

(51) Int. Cl.
   *G01S 7/48* (2006.01)
   *G01S 17/89* (2020.01)
   *G06K 9/62* (2022.01)

(56) References Cited

U.S. PATENT DOCUMENTS

| | | | |
|---|---|---|---|
| 2007/0293985 A1 | 12/2007 | Myeong et al. | |
| 2009/0226113 A1* | 9/2009 | Matsumoto | G06K 9/00691 |
| | | | 382/284 |
| 2010/0198513 A1* | 8/2010 | Zeng | G01S 17/931 |
| | | | 701/300 |
| 2012/0121161 A1* | 5/2012 | Eade | G05D 1/0253 |
| | | | 382/153 |
| 2014/0005933 A1 | 1/2014 | Fong et al. | |
| 2014/0293016 A1* | 10/2014 | Benhimane | G06T 17/00 |
| | | | 348/50 |
| 2016/0005229 A1* | 1/2016 | Lee | G06F 3/0488 |
| | | | 345/419 |
| 2016/0139255 A1 | 5/2016 | Bueschenfeld et al. | |
| 2017/0307746 A1 | 10/2017 | Rohani et al. | |
| 2020/0019169 A1* | 1/2020 | Suvarna | A47L 9/2894 |

FOREIGN PATENT DOCUMENTS

| | | |
|---|---|---|
| CN | 103674015 A | 3/2014 |
| CN | 106782029 A | 5/2017 |
| CN | 107167141 A | 9/2017 |
| CN | 107239076 A | 10/2017 |
| JP | 2006510097 A | 3/2006 |
| JP | 2011209845 A | 10/2011 |
| JP | 2017090239 A | 5/2017 |
| JP | 2017198517 A | 11/2017 |
| WO | 2013030929 A1 | 3/2013 |
| WO | 2015037222 A1 | 3/2015 |

OTHER PUBLICATIONS

The State Intellectual Property of People's Republic of China, First Search of Priority Application CN2017112147373, 1 page.
The State Intellectual Property Office of People's Republic of China, First Office Action, Application No. 201711214737.3, dated Apr. 24, 2019, 5 pages (English Translation Attached).
The State Intellectual Property Office of People's Republic of China, Notification to Grant Patent Right for Invention, Application No. 201711214737.3, dated Nov. 13, 2019, 4 pages. (English Translation attached).
Written Opinion of the International Searching Authority, Application No. PCT/CN2018/075158, dated Aug. 9, 2018, 4 pages. (English Translation Attached).
International Search Report, Application No. PCT/CN2018/075158, dated Aug. 9, 2018, 5 pages. (English translation attached.).
European Patent Office, Communication pursuant to Article 94(3) EPC, dated Jan. 18, 2021, 8 pages.
Japan Patent Office, Decision to Grant a Patent, Application No. 2020531502, 3 pages.

* cited by examiner

METHOD AND DEVICE FOR DRAWING REGION OUTLINE AND COMPUTER READABLE STORAGE MEDIUM

CROSS-REFERENCE TO RELATED APPLICATIONS

This application claims priority of Chinese Patent Application No. 2017112147373, filed with the Chinese Patent Office on Nov. 28, 2017, entitled "Method and Device for Drawing Region Outline", the contents of which are incorporated herein by reference in their entirety.

TECHNICAL FIELD

The present disclosure relates to the field of smart household appliances, and in particular to a method and device for drawing an outline (or contour) of a region (or an area), and a computer-readable storage medium.

BACKGROUND ART

Driven by the technologies of artificial intelligence, computer technology, and sensor, the mobile robot technology has made rapid development and broad application in fields such as logistics, detection, service, and the like because of its mobility and autonomy. As one of the core technologies for mobile robots, the SLAM (Simultaneous Localization and Mapping) mapping and localization technology for mobile robots, has always been a focus of research on.

The SLAM mapping and localization technology becomes more important to floor cleaning robots (or robotic vacuum cleaners). Due to complex and diverse home environments and dynamic changes in the environments, the SLAM mapping is prone to construction errors in complex environments, which will directly cause the robots to perform inaccurate and incorrect localization and fail to execute tasks normally.

SUMMARY

In view of this, embodiments of the present disclosure provide a method and device for drawing region outline, and a computer-readable storage medium.

An embodiment of the present disclosure provides a method for drawing an outline of a region, the method comprising steps of: updating an original region outline map according to a first predetermined algorithm to obtain a first region outline map; updating the original region outline map according to a second predetermined algorithm to obtain a second region outline map; acquiring and processing first distance data obtained by a laser radar to generate a first to-be-matched outline map; comparing the first to-be-matched outline map with the first region outline map and the second region outline map, respectively; and replacing the second region outline map with the first region outline map if the similarity between the first region outline map and the first to-be-matched outline map is higher than the similarity between the second region outline map and the first to-be-matched outline map.

In a possible design, the step of updating an original region outline map according to a first predetermined algorithm to obtain a first region outline map includes: obtaining a copy of the original region outline map, and updating the copy of the original region outline map using the first predetermined algorithm so as to obtain the first region outline map.

In a possible design, the step of updating an original region outline map according to a first predetermined algorithm to obtain a first region outline map includes: acquiring and processing second distance data obtained by the laser radar to generate a second to-be-matched outline map; comparing the second to-be-matched outline map with the original region outline map, and judging whether a location in the second to-be-matched outline map corresponding to the original region outline map contains an obstacle that does not appear in the original region outline map; wherein if a location in the second to-be-matched outline map corresponding to the original region outline map contains an obstacle that does not appear in the original region outline map, it is judged whether the size of the obstacle exceeds a preset size, wherein if yes, the original region outline map is used as the first region outline map; and if not, the corresponding location in the original region outline map is replaced with that in the second to-be-matched outline map, and using the resulting map as the first region outline map.

In a possible design, the step of acquiring and processing second distance data obtained by the laser radar includes: acquiring a distance between a floor cleaning robot and an edge of a room captured by the laser radar every predetermined time period, and using the distance as the second distance data; and processing the second distance data.

In a possible design, the step of updating the original region outline map according to a second predetermined algorithm to obtain a second region outline map includes: acquiring and processing third distance data obtained by the laser radar to generate a third to-be-matched outline map; and replacing a corresponding location in the original region outline map with that in the third to-be-matched outline map, and using the resulting map as the second region outline map.

In a possible design, the method further comprises: retaining the second region outline map if the similarity between the first region outline map and the first to-be-matched outline map is lower than the similarity between the second region outline map and the first to-be-matched outline map.

In a possible design, the method further comprises: judging whether the original region outline map exists; wherein if yes, the step of updating the original region outline map according to the first predetermined algorithm to obtain the first region outline map is executed.

In a possible design, after the step of judging whether the original region outline map exists, the method further comprises: if the original region outline map does not exist, acquiring and processing fourth distance data obtained by the laser radar to generate a fourth region outline map, and obtaining the original region outline map according to the fourth region outline map.

An embodiment of the present disclosure further provides a device for drawing an outline of a region, the device comprising: a first region outline module configured to update an original region outline map according to a first predetermined algorithm to obtain a first region outline map; a second region outline module configured to update the original region outline map according to a second predetermined algorithm to obtain a second region outline map; a to-be-matched outline module configured to acquire and process first distance data obtained by a laser radar to generate a first to-be-matched outline map; a comparison module configured to compare the first to-be-matched outline map with the first region outline map and the second region outline map, respectively; and an outline replacement module configured to replace the second region outline map with the first region outline map if the similarity between the first region outline map and the first to-be-matched outline map is higher than the similarity between the second region outline map and the first to-be-matched outline map.

In a possible design, the first region outline module comprises: a first distance data submodule configured to acquire a copy of the original region outline map and update the copy of the original region outline map using the first predetermined algorithm so as to obtain the first region outline map.

In a possible design, the first region outline module further comprises: a second distance data submodule configured to acquire and process second distance data obtained by the laser radar to generate a second to-be-matched outline map; an obstacle judgment submodule configured to compare the second to-be-matched outline map with the original region outline map, and judge whether a location in the second to-be-matched outline map corresponding to the original region outline map contains an obstacle that does not appear in the original region outline map; a preset size submodule configured to judge whether the size of the obstacle exceeds a preset size; a first option submodule configured to use the original region outline map as the first region outline map; and a second option submodule configured to replace the corresponding location in the original region outline map with that in the second to-be-matched outline map, and use the resulting map as the first region outline map.

In a possible design, the second distance data submodule is configured to acquire a distance between a floor cleaning robot and an edge of a room captured by the laser radar every predetermined time period, and use the distance as the second distance data; and process the second distance data.

In a possible design, the second region outline module comprises: a third distance data submodule configured to acquire and process third distance data obtained by the laser radar to generate a third to-be-matched outline map; and a second outline acquisition submodule configured to replace a corresponding location in the original region outline map with the third to-be-matched outline map, and use the resulting map as the second region outline map.

In a possible design, the device further comprises: a second region retention module configured to retain the second region outline map if the similarity between the first region outline map and the first to-be-matched outline map is lower than the similarity between the second region outline map and the first to-be-matched outline map.

In a possible design, the device further comprises: an original outline judgment module configured to judge whether the original region outline map exists; and a step skipping module configured to execute the step of updating the original region outline map according to the first predetermined algorithm to obtain the first region outline map.

In a possible design, the device further comprises: a fourth region generation module configured to acquire and process fourth distance data obtained by the laser radar to generate a fourth region outline map if the original region outline map does not exist; and an original region obtaining module configured to obtain the original region outline map according to the fourth region outline map.

An embodiment of the present disclosure provides a computer-readable storage medium configured to store a computer instruction, wherein a corresponding program configured to execute the method described above is included in the computer instruction.

In the method and device for drawing an outline of a region and a computer-readable storage medium according to the embodiments of the present disclosure, an original region outline map is updated according to a first predetermined algorithm to obtain a first region outline map; the original region outline map is updated according to a second predetermined algorithm to obtain a second region outline map; first distance data obtained by a laser radar is acquired and processed to generate a first to-be-matched outline map; the first to-be-matched outline map is compared with the first region outline map and the second region outline map, respectively; if the similarity between the first region outline map and the first to-be-matched outline map is higher than the similarity between the second region outline map and the first to-be-matched outline map, the second region outline map is replaced with the first region outline map. The original region outline map is processed using a first predetermined algorithm and a second predetermined algorithm to obtain a first region outline map and a second region outline map, respectively, and then a first to-be-matched outline map is obtained in real time, and the first to-be-matched outline map is compared with the first region outline map and the second region outline map, respectively. When the first region outline map has higher similarity with the first to-be-matched outline map than the second region outline map, the second region outline map is replaced with the first region outline map, so that the region outline map is updated in real time, and the technical problem of inaccurate localization in the prior art robots is alleviated.

BRIEF DESCRIPTION OF DRAWINGS

In order to more clearly illustrate technical solutions of embodiments of the present disclosure or of the prior art, drawings required for use in the description of the embodiments or the prior art will be described briefly below. It is apparent that the drawings in the following description are merely illustrative of some embodiments of the present disclosure. It will be understood by those of ordinary skill in the art that other drawings can also be obtained from these drawings without any inventive effort.

DETAILED DESCRIPTION OF EMBODIMENTS

Figure 1:
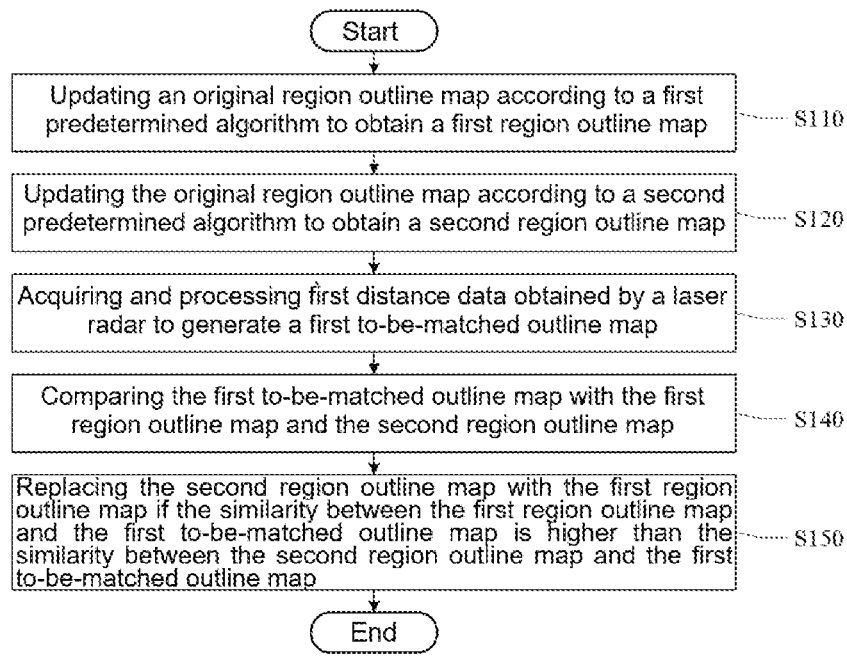
FIG. 1 is a schematic flowchart of a method for drawing an outline of a region according to an embodiment of the present disclosure.

Referring to FIG. 1, FIG. 1 shows a schematic flowchart of a method for drawing an outline of a region according to the present disclosure, which comprises the following steps:

Step S110: updating an original region outline map according to a first predetermined algorithm to obtain a first region outline map.

In the embodiment of the present disclosure, a floor cleaning robot updates an original region outline map (or drawing) according to a first predetermined algorithm to obtain a first region outline map. Here, the original region outline map refers to a room topographic map drawn by the floor cleaning robot when it draws a map of a room by scanning the room for the first time. The room topographic map may be a topographic map of the entire house, for example, a room topographic map of at least one of a master bedroom, a secondary bedroom, a living room, and a bathroom.

In the embodiment of the present disclosure, the first region outline map may be a duplicate (or copy) file of the original region outline map. In this case, the floor cleaning robot may update the duplicate file of the original region outline map by using the first predetermined algorithm so as to obtain the first region outline map.

The process of obtaining the first region outline map is described below.

Figure 2:
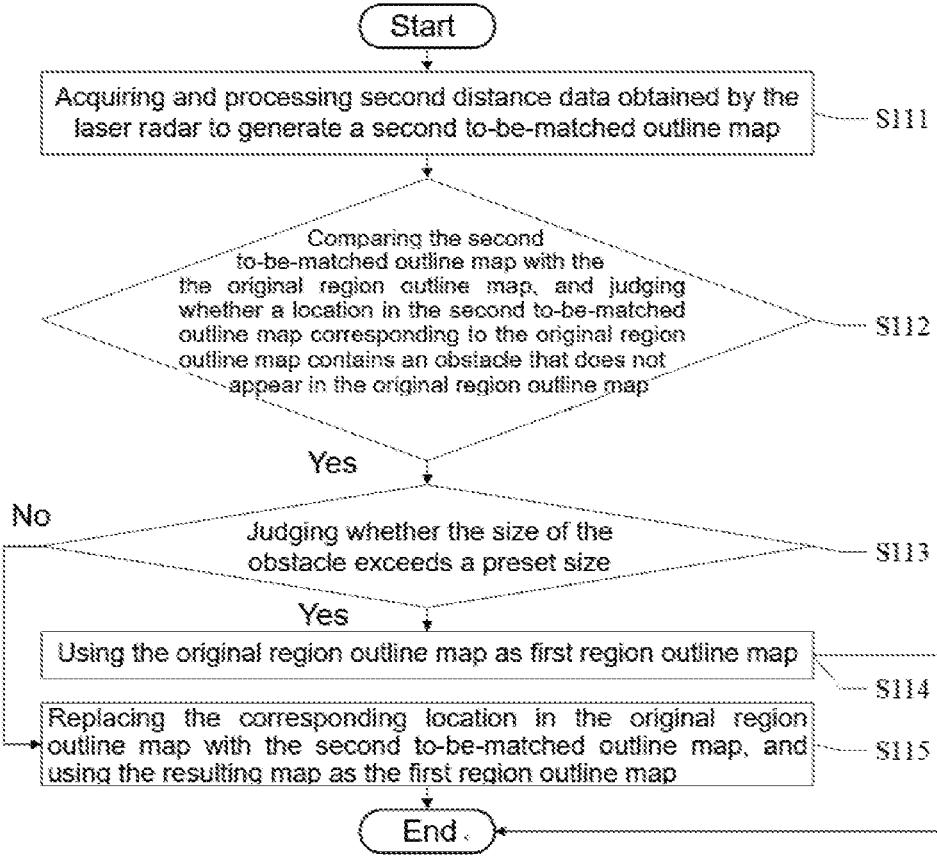
FIG. 2 is a schematic diagram of step S110 in FIG. 1.

Referring to FIG. 2, FIG. 2 shows a schematic diagram of the step S110. The step S110 comprises the following steps:

Step S111, acquiring and processing second distance data obtained by a laser radar (or lidar) to generate a second to-be-matched outline map.

In the embodiment of the present disclosure, the floor cleaning robot acquires and processes the second distance data obtained by the laser radar and then generates a second to-be-matched outline map (outline map to be matched). In other words, in the embodiment of the present disclosure, the second distance data is obtained mainly by the laser radar.

The laser radar is a radar system that detects the characteristic quantities such as position and velocity of a target by emitting laser beams. In the embodiment of the present disclosure, the laser radar is an important component of the floor cleaning robot. The laser radar draws an outline map of a room by scanning a distance between the floor cleaning robot and an edge of the room.

Optionally, the laser radar may also cooperate with an odometer to achieve the drawing of the outline of the room. Here, the odometer is also a component installed in the floor cleaning robot. The odometer is a sensor configured to calculate the position of a robot. Displacements of traveling of wheels of a vehicle may be recorded by an encoder, and then the actual position of the vehicle may be reckoned according to a two-wheel differential (speed) model for the vehicle. When the odometer is installed in the floor cleaning robot, the odometer is configured to calculate the position of the floor cleaning robot, wherein displacements of traveling of the wheels of the floor cleaning robot may be recorded by the encoder, and then the actual position of the floor cleaning robot may be reckoned according to a wheel differential model for the wheels of the floor cleaning robot.

In the embodiment of the present disclosure, the laser radar may capture the distance between the edge of the room and the floor cleaning robot in real time, or may capture the distance between the edge of the room and the floor cleaning robot for every predetermined time period and use the distance as the second distance data. For example, the distance between the edge of the room and the floor cleaning robot may be captured every one minute, or the distance between the edge of the room and the floor cleaning robot may be captured every two minutes. It should be noted that, in the embodiment of the present disclosure, the predetermined time may be set as actually required and is not specifically limited in this embodiment. After acquiring the second distance data, the floor cleaning robot may generate a second to-be-matched outline map according to the second distance data, wherein in this embodiment, the second to-be-matched outline map may be an outline map of a part of the room.

Step S112: comparing the second to-be-matched outline map with the original region outline map to judge whether a location which is in the second to-be-matched outline map and corresponding to the original region outline map contains an obstacle that does not appear in the original region outline map, wherein if yes, step S113 is executed.

An obstacle might appear at a previously unoccupied location due to a change in the position of an item placed in the room, and may, for example, the obstacle may be a moving person, a moving electric toy car, a movable chair, or the like; or an obstacle might appear at a previously unoccupied location due to incorrect establishment of the outline map by the floor cleaning robot.

If an obstacle that does not appear in the original region outline map appears in the second to-be-matched outline map, step S113 may be executed.

Step S113: judging whether the size of the obstacle exceeds a preset size, wherein if yes, step S114 is executed; if not, step S115 is executed.

In the embodiment of the present disclosure, one purpose of judging whether the size of the obstacle exceeds a preset size is to determine whether the obstacle appears at a previously unoccupied location due to a change in the position of an item placed in the room, or due to incorrect establishment of the outline map by the floor cleaning robot. Therefore, in this embodiment, the laser radar may obtain the size of the obstacle in order to distinguish whether the obstacle appears at a previously unoccupied location due to a change in the position of an item placed in the room, or due to the incorrect establishment of the outline map by the floor cleaning robot. If the size of the obstacle exceeds the preset size, it may be determined that the obstacle appears at a previously unoccupied location due to the incorrect establishment of the outline map by the floor cleaning robot. At this time, step S114 is executed, namely, the original region outline map is to be used as the first region outline map. If the size of the obstacle does not exceed the preset size, it may be determined that the obstacle appears at a previously unoccupied location due to a change in the position of an item placed in the room, and step S115 is executed, namely, the corresponding location in the original region outline map is replaced with that in the second to-be-matched outline map, and the resulting map is to be used as the first region outline map. It should be noted that, in the embodiment of the present disclosure, the preset size may be preselected according to practical experience and is not specifically limited in this embodiment.

Step S114: using the original region outline map as the first region outline map.

In this embodiment, since the obstacle appears in the generated second to-be-matched outline map due to the incorrect establishment of the outline map by the floor cleaning robot, the second to-be-matched outline map currently captured by the floor cleaning robot is not stored and the previous original region outline map is used as the first region outline map.

Step S115: replacing the corresponding location in the original region outline map with that in the second to-be-matched outline map, and using the resulting map as the first region outline map.

In this embodiment, if the obstacle appears at a previously unoccupied location due to a change in the position of an item placed in the room, the floor cleaning robot should record the second to-be-matched outline map to update the topographic map of the room.

As described above, in this embodiment, the floor cleaning robot may obtain the first region outline map of the room by the method described in the above steps S111 to S115. Here, the first region outline map may be an outline map of a part of the room or an outline map of the entire room.

After the first region outline map is determined, a second region outline map may be determined in a manner described in the step S120 described below.

Step S120: updating the original region outline map according to a second predetermined algorithm to obtain a second region outline map.

The second region outline map is obtained by updating the original region outline map by a second predetermined algorithm. Here, the first predetermined algorithm and the second predetermined algorithm are not identical.

Optionally, the second region outline map is obtained in the manner as seen in the following steps.

Figure 3:
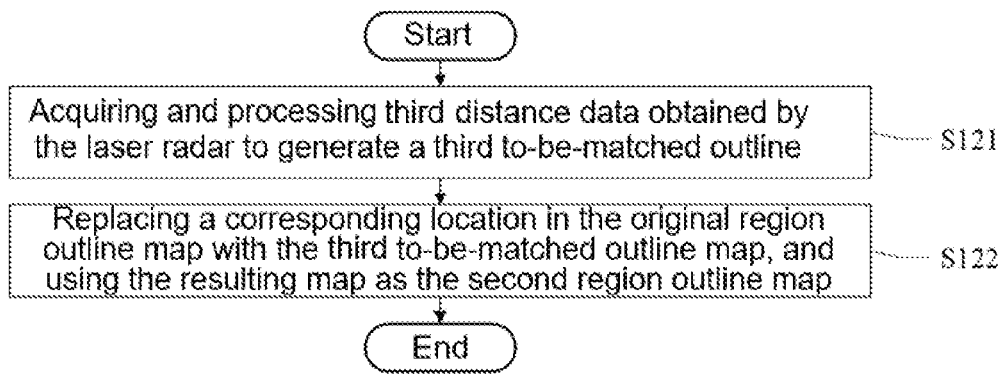
FIG. 3 is a schematic diagram of step S120 in FIG. 1.

In this embodiment, referring to FIG. 3, FIG. 3 shows a schematic diagram of the step S120, which comprises the following steps:

Step S121: acquiring and processing third distance data obtained by the laser radar to generate a third to-be-matched outline map.

In this embodiment, the floor cleaning robot acquires and processes the third distance data obtained by the laser radar to generate a third to-be-matched outline map.

The above-mentioned third to-be-matched outline map is generated by the floor cleaning robot according to the third distance data obtained in real time by the laser radar. Optionally, the floor cleaning robot receives the third distance data obtained by the laser radar, and generates a third to-be-matched outline map according to the third distance data.

Step S122: replacing a corresponding location in the original region outline map with that in the third to-be-matched outline map, and using the resulting map as the second region outline map.

In this embodiment, after obtaining the third to-be-matched outline map, the floor cleaning robot may replace the corresponding location in the original region outline map with that in the third to-be-matched outline map, and use the resulting map as the second region outline map.

At this time, the floor cleaning robot receives the third distance data detected by the laser radar, and draws a corresponding third to-be-matched outline map according to the third distance data.

It should be noted that, in this embodiment, the original region outline map will be replaced with the third to-be-matched outline map, regardless of whether the third to-be-matched outline map is drawn correctly or incorrectly. In other words, the third to-be-matched outline map might contain an obstacle that appears at a location unoccupied in the original region outline map due to the incorrect establishment of the outline map by the floor cleaning robot. At this time, it may be necessary to replace the original region outline map with the third to-be-matched outline map, and use the original region outline map after replacement as the second region outline map.

Step S130: acquiring and processing first distance data obtained by the laser radar to generate a first to-be-matched outline map.

In this embodiment, the laser radar in the floor cleaning robot obtains the first distance data. At this time, the floor cleaning robot may draw a corresponding first to-be-matched outline map according to the obtained first distance data. The first to-be-matched outline map obtained here is later by one frame than the generated first region outline map or second region outline map, and is the latest acquired.

Step S140: comparing the first to-be-matched outline map with the first region outline map and the second region outline map, respectively.

In this embodiment, the first to-be-matched outline map generated according to the latest acquired distance data may be compared with the first region outline map and the second region outline map, respectively, so as to judge which one of the first region outline map and the second region outline map is more approximate (or consistent) to the latest obtained distance data. For example, the first to-be-matched outline map is compared with the first region outline map to obtain a similarity; and the first to-be-matched outline map is compared with the second region outline map to obtain another similarity. At this time, it may be determined, according to the two similarities, which one of the first region outline map and the second region outline map is more approximate to the latest obtained distance data.

Step S150: replacing the second region outline map with the first region outline map if a similarity between the first region outline map and the first to-be-matched outline map is higher than a similarity between the second region outline map and the first to-be-matched outline map.

In this embodiment, if the similarity between the first region outline map and the first to-be-matched outline map is higher than the similarity between the second region outline map and the first to-be-matched outline map, it indicates that the first region outline map is more approximate to the real status of item distribution in the room, therefore the first region outline map is to be retained.

In this embodiment, if the similarity between the first region outline map and the first to-be-matched outline map is lower than the similarity between the second region outline map and the first to-be-matched outline map, the second region outline map is retained and is not to be replaced with the first region outline map.

Figure 4:
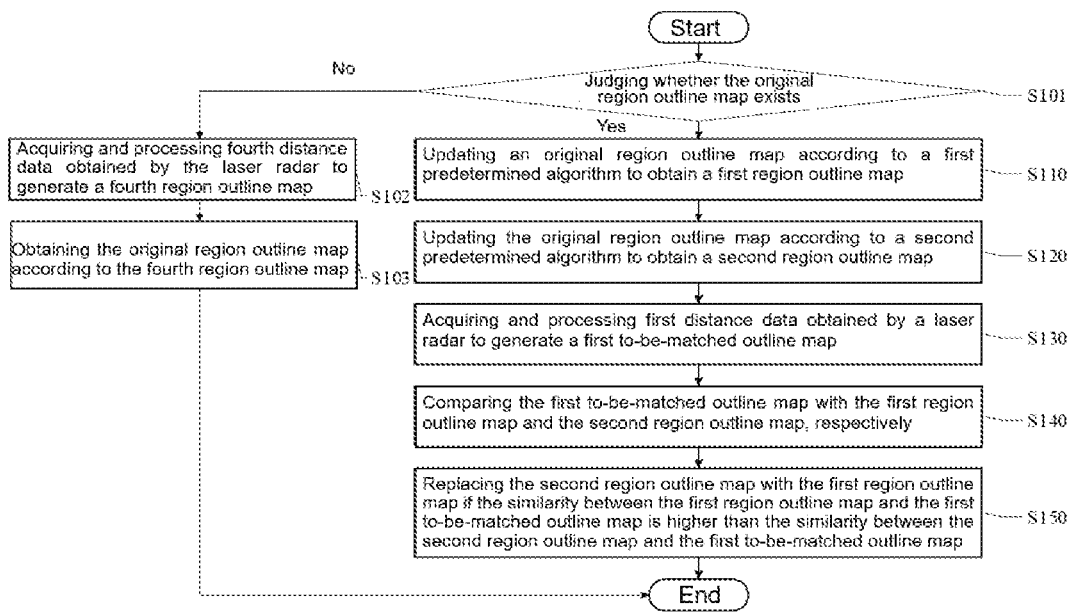
FIG. 4 is a schematic flowchart of an implementation of the method for drawing an outline of a region according to an of the present disclosure.

Referring to FIG. 4, FIG. 4 shows an implementation of the method for drawing an outline of a region according to an embodiment of the present disclosure, which comprises the following steps:

Step S101: judging whether the original region outline map exists, wherein if yes, the step S110 is executed; and if not, step S102 is executed.

In this embodiment, prior to the step S110, namely, before the original region outline map is updated according to the first predetermined algorithm to obtain the first region outline map, it may be judged whether the original region outline map exists; wherein if the original region outline map exists, a process may be performed in accordance with the procedures described in the above step S110 to step S150; and if the original region outline map does not exist, it indicates that the original region outline map is not stored in the floor cleaning robot from the very beginning, which indicates that the floor cleaning robot shall draw a topographic map in an unfamiliar environment for the first time. At this time, the floor cleaning robot needs to draw an original region outline map. Optionally, the original region outline map may be drawn according to step S102 and step S103.

Step S102: acquiring and processing fourth distance data obtained by the laser radar to generate a fourth region outline map.

Since the floor cleaning robot is drawing an original region outline map in a completely unfamiliar environment, the floor cleaning robot may capture fourth distance data by using the laser radar and generate the fourth region outline map.

Step S103: obtaining the original region outline map according to the fourth region outline map.

After the floor cleaning robot generates the fourth region outline map, the fourth region outline map is directly used as the original region outline map. After acquiring the original region outline map, the floor cleaning robot may perform a processing in accordance with the procedures described in the above steps S110 to S150, which comprises:

Step S110: updating the original region outline map according to a first predetermined algorithm to obtain a first region outline map.

In this embodiment, the first region outline map may be obtained in the manner described in the step S111 to step S115 in the foregoing embodiment, which will not be described in detail here.

Step S120: updating the original region outline map according to a second predetermined algorithm to obtain a second region outline map.

In this embodiment, the second region outline map may be obtained in the manner described in the step S121 and step S122 in the foregoing embodiment, which will not be described in detail here.

Step S130: acquiring and processing first distance data obtained by the laser radar to generate a first to-be-matched outline map.

In this embodiment, the laser radar in the floor cleaning robot is configured to obtain the first distance data. At this time, the floor cleaning robot may draw a corresponding first to-be-matched outline map according to the obtained first distance data. The first to-be-matched outline map obtained here is later by one frame than the generated first region outline map or second region outline map, and is the latest acquired.

Step S140: comparing the first to-be-matched outline map with the first region outline map and the second region outline map, respectively.

In this embodiment, the first to-be-matched outline map generated according to the latest acquired distance data may be compared with the first region outline map and the second region outline map, respectively, so as to judge which one of the first region outline map and the second region outline map is more approximate to the latest obtained distance data. For example, the first to-be-matched outline map is compared with the first region outline map to obtain a similarity, and the first to-be-matched outline map is compared with the second region outline map to obtain another similarity. At this time, it may be determined, according to the two similarities, which one of the first region outline map and the second region outline map is more approximate to the latest obtained distance data.

Step S150: replacing the second region outline map with the first region outline map if the similarity between the first region outline map and the first to-be-matched outline map is higher than the similarity between the second region outline map and the first to-be-matched outline map.

In this embodiment, if the similarity between the first region outline map and the first to-be-matched outline map is higher than the similarity between the second region outline map and the first to-be-matched outline map, it indicates the first region outline map is more approximate to the real status of item distribution in the room, therefore the first region outline map is retained.

In this embodiment, if the similarity between the first region outline map and the first to-be-matched outline map is lower than the similarity between the second region outline map and the first to-be-matched outline map, the second region outline map is retained and is not to be replaced with the first region outline map.

The steps S110 to S150 as shown in FIG. 4 are the same as the steps S110 to S150 as shown in FIG. 1 and will not be described repeatedly here.

In this embodiment, an original region outline map is processed using a first predetermined algorithm and a second predetermined algorithm to obtain a first region outline map and a second region outline map, respectively, and then a first to-be-matched outline map is obtained in real time, and the first to-be-matched outline map is compared with the above-mentioned two first region outline map and a second region outline map, respectively. When the former has higher similarity with the first to-be-matched outline map than the latter, the second region outline map is replaced with the first region outline map, so that the region outline map can be updated in real time, and the technical problem of inaccurate localization in the prior art robots is alleviated.

Figure 5:
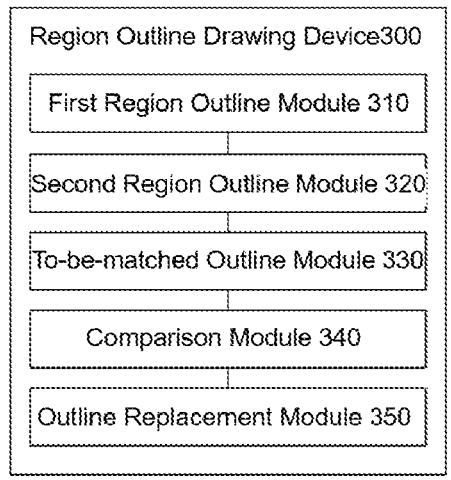
FIG. 5 is a structural block diagram of a device for drawing an outline of a region according to an embodiment of the present disclosure.

Referring to FIG. 5, FIG. 5 shows a device for drawing an outline of a region according to a second embodiment of the present disclosure. The device 300 comprises:

a first region outline module 310 configured to update an original region outline map according to a first predetermined algorithm to obtain a first region outline map;

wherein the first region outline module 310 includes a first distance data submodule configured to acquire a copy of the original region outline map; and update the copy of the original region outline map using the first predetermined algorithm so as to obtain the first region outline map.

wherein the first region outline module 310 further includes: a second distance data submodule configured to acquire and process second distance data obtained by the laser radar to generate a second to-be-matched outline map; an obstacle judgment submodule configured to compare the second to-be-matched outline map with the original region outline map, and judge whether a location in the second to-be-matched outline map corresponding to that of the original region outline map contains an obstacle that does not appear in the original region outline map; a preset size submodule configured to judge whether the size of the obstacle exceeds a preset size; a first option submodule configured to use the original region outline map as the first region outline map; and a second option submodule configured to replace the corresponding location in the original region outline map with that in the second to-be-matched outline map, and use the resulting map as the first region outline map;

wherein the second distance data submodule is configured to acquire a distance between the floor cleaning robot and an edge of a room captured by the laser radar every predetermined time period, and use the distance as the second distance data; and process the second distance data;

a second region outline module 320 configured to update the original region outline map according to a second predetermined algorithm to obtain a second region outline map;

wherein the second region outline module 320 includes: a third distance data submodule configured to acquire and process third distance data obtained by the laser radar to generate a third to-be-matched outline map; and a second outline acquisition submodule configured to replace a corresponding location in the original region outline map with that in the third to-be-matched outline map, and use the resulting map as the second region outline map;

a to-be-matched outline module 330 configured to acquire and process first distance data obtained by the laser radar to generate a first to-be-matched outline map;

a comparison module 340 configured to compare the first to-be-matched outline map with the first region outline map and the second region outline map, respectively; and an outline replacement module 350 configured to replace the second region outline map with the first region outline map if the similarity between the first region outline map and the first to-be-matched outline map is higher than the similarity between the second region outline map and the first to-be-matched outline map.

The device further comprises:
a second region retention module configured to retain the second region outline map if the similarity between the first region outline map and the first to-be-matched outline map is lower than the similarity between the second region outline map and the first to-be-matched outline map;
an original outline judgment module configured to judge whether the original region outline map exists;
a step skipping module configured to execute a step of "updating the original region outline map according to the first predetermined algorithm to obtain the first region outline map";
a fourth region generation module configured to acquire and process fourth distance data obtained by the laser radar to generate a fourth region outline map if the original region outline map does not exist; and
an original region obtaining module configured to obtain the original region outline map according to the fourth region outline map.

It will be clearly appreciated by those skilled in the art that, for convenience and brevity of the description, operating processes of the device described above may be performed with reference to the corresponding processes in the method described previously and will not be described repeatedly here.

In the method and device for drawing an outline of a region and a computer-readable storage medium according to the embodiments of the present disclosure, an original region outline map is updated according to a first predetermined algorithm to obtain a first region outline map; the original region outline map is updated according to a second predetermined algorithm to obtain a second region outline map; first distance data obtained by a laser radar is acquired and processed to generate a first to-be-matched outline map; the first to-be-matched outline map is compared with the first region outline map and the second region outline map, respectively; wherein if the similarity between the first region outline map and the first to-be-matched outline map is higher than the similarity between the second region outline map and the first to-be-matched outline map, the second region outline map is replaced with the first region outline map. The original region outline map is processed using a first predetermined algorithm and a second predetermined algorithm to obtain a first region outline map and a second region outline map, respectively, and then a first to-be-matched outline map is obtained in real time, and the first to-be-matched outline map is compared with the first region outline map and the second region outline map respectively. When the first region outline map has higher similarity with the first to-be-matched outline map than the second region outline map, the second region outline map is replaced with the first region outline map, so that the region outline map is updated in real time, and the technical problem of inaccurate localization in the prior art robots is alleviated.

It should be noted that the embodiments in this specification are described in a progressive manner, each embodiment focuses on the differences from other embodiments, and the same or similar parts between the embodiments may be understood with mutual reference to each other. The device embodiment is substantially similar to the method embodiment and thus is described more simply, and the relevant parts may be understood with reference to the description of the method embodiment.

In several embodiments according to the present disclosure, it should be understood that the disclosed device and method may also be implemented in other ways. The embodiment of the device described above is merely illustrative in nature. For example, the flow charts and block diagrams in the figures illustrate implementable architectures, functionalities, and operations of devices, methods and computer program products according to multiple embodiments of the present disclosure. In this regard, each block in the flow charts or block diagrams may represent a module, a program segment, or a portion of code, wherein the module, the program segment, or the portion of code includes one or more executable instructions for implementing specified logical function(s). It should also be noted that in some alternative implementations, the functions shown in the blocks may occur out of the order noted in the figures. For example, two blocks shown in succession may in fact be executed substantially concurrently, or they may sometimes be executed in a reverse order, depending upon the functionality involved. It will also be noted that each block of the block diagrams and/or flow charts, and combinations of blocks in the block diagrams and/or flow charts, may be implemented by special purpose hardware-based systems that execute the specified functions or actions, or by a combination of special purpose hardware and computer instructions.

In addition, the individual functional modules in the embodiments of the present disclosure may be integrated into one independent part, or each of the modules may be physically stand-alone, or two or more of the modules may be integrated into one part.

When implemented in the form of a software functional module and sold or used as an independent product, the functions may be stored in a computer-readable storage medium. Based on such understanding, the technical solutions of the present disclosure essentially, or the part thereof contributing to the prior art, or a part of the technical solutions may be embodied in the form of a software product. The computer software product is stored in a storage medium, and includes a number of instructions for causing a computer device (which may be a personal computer, a server, a network device, or the like) to execute all or some of the steps of the methods described in the various embodiments of the present disclosure. The preceding storage medium includes any medium that can store program codes, such as a USB flash disk, a mobile hard disk, a read-only memory (ROM), a random access memory (RAM), a magnetic disk, or an optical disk. It should be noted that in this text, relationship terms such as first, second, and the like are used only for distinguishing one entity or operation from another entity or operation, while it is not necessarily required or implied that these entities or operations have any such practical relationship or order. Furthermore, the terms "comprise", "include", or any variations thereof are intended to cover non-exclusive inclusions, such that a process, method, article, or device that comprises a list of elements not only comprises those elements, but also comprises other elements not expressly listed or also comprises elements inherent to such process, method, article, or device. Without more restrictions, an element defined with the wording "comprising a . . . " does not exclude the presence of additional identical elements in the process, method, article or device comprising said element.

The above description is merely illustrative of preferred embodiments of the present disclosure and is not intended to limit the present disclosure. It will be understood by those skilled in the art that various modifications and variations can be made to the present disclosure. Any modifications, equivalent alternatives, improvements and so on made within the spirit and principle of the present disclosure are to be included in the scope of protection of the present disclosure. It should be noted that similar reference numerals and letters refer to similar items in the following figures. Thus, once an item is defined in one figure, it may not be further defined or explained in the following figures.

The above description is merely illustrative of specific embodiments of the present disclosure, but the scope of protection of the present disclosure is not limited thereto, and any variations or alternatives that can be readily envisaged by those skilled in the art within the technical scope disclosed in the present disclosure are intended to be encompassed in the scope of protection of the present disclosure. Therefore, the scope of protection of the present disclosure should be determined by the scope of the claims.

INDUSTRIAL APPLICABILITY

The method and device for drawing an outline of a region provided in the embodiments of the present disclosure enables real-time update of a region outline map, so that the prior art robots can perform more accurate localization.

What is claimed is:

1. A device for drawing an outline of a region, comprising:
  a first region outline module configured to update an original region outline map to obtain a first region outline map, first region outline module comprising:
    a second distance data submodule configured to generate a second to-be-matched outline map using a laser radar;
    an obstacle judgment submodule configured to compare the second to-be-matched outline map with the original region outline map, and judge whether a location in the second to-be-matched outline map corresponding to the original region outline map contains an obstacle that does not appear in the original region outline map;
    a preset size submodule configured to judge whether the size of the obstacle exceeds a preset size;
    a first option submodule configured to use the original region outline map as the first region outline map; and
    a second option submodule configured to replace the corresponding location in the original region outline map with a respective location in the second to-be-matched outline map, and use the resulting map as the first region outline map;
  a second region outline module configured to update the original region outline map to obtain a second region outline map, the second region outline module comprising:
    a third distance data submodule configured to acquire and process third distance data obtained by the laser radar to generate a third to-be-matched outline map; and
    a second outline acquisition submodule configured to replace a corresponding location in the original region outline map with a respective location in the third to-be-matched outline map upon detecting an obstacle that appears at a location unoccupied in the original region outline map, and use the resulting map as the second region outline map;
  a to-be-matched outline module configured to acquire and process first distance data obtained by a laser radar to generate a first to-be-matched outline map;
  a comparison module configured to compare the first to-be-matched outline map with the first region outline map and the second region outline map respectively; and
  an outline replacement module configured to replace the second region outline map with the first region outline map if a similarity between the first region outline map and the first to-be-matched outline map is higher than a similarity between the second region outline map and the first to-be-matched outline map.

2. The device according to claim 1, wherein the first region outline module comprises:
  a first distance data submodule configured to acquire a copy of the original region outline map and update the copy of the original region outline map so as to obtain the first region outline map.

3. The device according to claim 1, wherein the second distance data submodule is configured to acquire a distance between a floor cleaning robot and an edge of a room, with the distance being captured by the laser radar every predetermined time period, and use the distance as the second distance data; and process the second distance data.

4. The device according to claim 1, wherein the device further comprises:
  a second region retention module configured to retain the second region outline map if the similarity between the first region outline map and the first to-be-matched outline map is lower than the similarity between the second region outline map and the first to-be-matched outline map.

5. The device according to claim 1, wherein the device further comprises:
  an original outline judgment module configured to judge whether the original region outline map exists; and
  a step skipping module configured to execute a step of updating the original region outline map to obtain the first region outline map.

6. The device according to claim 1, wherein the device further comprises:
  a fourth region generation module configured to acquire and process fourth distance data obtained by the laser radar to generate a fourth region outline map if the original region outline map does not exist; and
  an original region obtaining module configured to obtain the original region outline map according to the fourth region outline map.

7. The device according to claim 2, wherein the first region outline module further comprises:
  a second distance data submodule configured to acquire and process second distance data obtained by the laser radar to generate a second to-be-matched outline map;
  an obstacle judgment submodule configured to compare the second to-be-matched outline map with the original region outline map, and judge whether a location in the second to-be-matched outline map corresponding to the original region outline map contains an obstacle that does not appear in the original region outline map;
  a preset size submodule configured to judge whether the size of the obstacle exceeds a preset size;
  a first option submodule configured to use the original region outline map as the first region outline map; and
  a second option submodule configured to replace the corresponding location in the original region outline map with a respective location in the second to-be-matched outline map, and use the resulting map as the first region outline map.

8. The device according to claim 3, wherein the second region outline module comprises:
- a third distance data submodule configured to acquire and process third distance data obtained by the laser radar to generate a third to-be-matched outline map; and
- a second outline acquisition submodule configured to replace a corresponding location in the original region outline map with a respective location in the third to-be-matched outline map, and use the resulting map as the second region outline map.

9. The device according to claim 2, wherein the device further comprises:
- a second region retention module configured to retain the second region outline map if the similarity between the first region outline map and the first to-be-matched outline map is lower than the similarity between the second region outline map and the first to-be-matched outline map.

\* \* \* \* \*